(12) United States Patent
Manku

(10) Patent No.: US 9,709,672 B2
(45) Date of Patent: Jul. 18, 2017

(54) METHOD AND SYSTEM FOR IDENTIFYING AND FINDING A RANGE OF AN OBJECT

(71) Applicant: DRNC Holdings, Inc., Wilmington, DE (US)

(72) Inventor: Tajinder Manku, Waterloo (CA)

(73) Assignee: DRNC Holdings, Inc., Wilmington, DE (US)

( * ) Notice: Subject to any disclaimer, the term of this patent is extended or adjusted under 35 U.S.C. 154(b) by 268 days.

(21) Appl. No.: 14/186,454

(22) Filed: Feb. 21, 2014

(65) Prior Publication Data

US 2015/0048966 A1  Feb. 19, 2015

Related U.S. Application Data

(60) Provisional application No. 61/866,687, filed on Aug. 16, 2013.

(51) Int. Cl.
*G01S 13/74* (2006.01)
*G01S 13/75* (2006.01)
*G01S 13/82* (2006.01)

(52) U.S. Cl.
CPC ............ *G01S 13/74* (2013.01); *G01S 13/758* (2013.01); *G01S 13/825* (2013.01)

(58) Field of Classification Search
CPC ...... G01S 13/74; G01S 13/758; G01S 13/825; G01S 13/84; G01S 13/34; G01S 13/751; G01S 13/878; G06K 19/0723; G06K 7/10316; G06K 7/10009; G06K 7/10039; G08B 13/2417; H04Q 2209/47; H04Q 9/00
USPC ....... 342/51, 47, 50, 118, 125–132, 134–135
See application file for complete search history.

(56) References Cited

U.S. PATENT DOCUMENTS

| | | | |
|---|---|---|---|
| 6,725,014 | B1 | 4/2004 | Voegele |
| 7,348,875 | B2 | 3/2008 | Hughes |
| 7,574,732 | B2 | 8/2009 | Knox |
| 7,742,773 | B2 | 6/2010 | Twitchell |

(Continued)

FOREIGN PATENT DOCUMENTS

| | | |
|---|---|---|
| EP | 2330538 A1 | 6/2011 |
| JP | 2000019246 | 1/2000 |

(Continued)

OTHER PUBLICATIONS

V. Viikari, P. Pursula and K. Jaakkola, "Ranging of UHF RFID Tag Using Stepped Frequency Read-Out," in IEEE Sensors Journal, vol. 10, No. 9, pp. 1535-1539, Sep. 2010.*

(Continued)

*Primary Examiner* — John B Sotomayor
(74) *Attorney, Agent, or Firm* — Invention Mine LLC

(57) ABSTRACT

A method for identifying and ranging a wireless device, comprising: transmitting an original radar signal from a detecting system; in response to the original radar signal, receiving a modulated radar signal at the detecting system, the modulated radar signal being backscattered from an antenna of the wireless device and containing information pertaining to the wireless device, and the modulated radar signal being a frequency offset version of the original radar signal; and, using a processor at the detecting system, determining an identity and a range of the wireless device from the modulated radar signal.

20 Claims, 9 Drawing Sheets

(56) References Cited

U.S. PATENT DOCUMENTS

| | | | |
|---|---|---|---|
| 8,334,801 B2* | 12/2012 | Fretenburg | G01S 5/14 342/118 |
| 8,559,554 B2 | 10/2013 | Vossiek | |
| 2002/0008615 A1* | 1/2002 | Heide | B60R 25/24 340/426.1 |
| 2002/0063622 A1* | 5/2002 | Armstrong | G06K 7/0008 340/10.31 |
| 2004/0033808 A1 | 2/2004 | Rorabaugh | |
| 2005/0012653 A1 | 1/2005 | Heide | |
| 2005/0099333 A1* | 5/2005 | Gila | G01S 13/348 342/118 |
| 2007/0103303 A1* | 5/2007 | Shoarinejad | G01S 19/05 340/572.1 |
| 2008/0176583 A1 | 7/2008 | Brachet | |
| 2008/0309550 A1 | 12/2008 | Sairo | |
| 2009/0160711 A1 | 6/2009 | Mehta | |
| 2009/0195360 A1 | 8/2009 | Jeon | |
| 2009/0303005 A1* | 12/2009 | Tuttle | H04Q 9/00 340/10.1 |
| 2009/0309780 A1 | 12/2009 | Albert | |
| 2010/0141398 A1 | 6/2010 | Borovoy | |
| 2010/0302005 A1* | 12/2010 | Popovski | H04W 16/14 340/10.1 |
| 2011/0006942 A1* | 1/2011 | Kluge | G01S 13/84 342/125 |
| 2011/0109440 A1* | 5/2011 | Muehlmann | G01S 13/84 340/10.1 |
| 2011/0234445 A1 | 9/2011 | Patrick | |
| 2011/0304497 A1* | 12/2011 | Molyneux | A43B 1/0054 342/42 |
| 2012/0052884 A1 | 3/2012 | Bogatin | |
| 2012/0112959 A1 | 5/2012 | Richard | |
| 2013/0178231 A1 | 7/2013 | Morgan | |
| 2013/0187761 A1 | 7/2013 | Shoarinejad | |
| 2013/0201003 A1* | 8/2013 | Sabesan | G01S 7/42 340/10.1 |
| 2013/0281120 A1 | 10/2013 | Oka | |
| 2013/0300619 A1 | 11/2013 | Manku | |
| 2014/0016719 A1 | 1/2014 | Manku | |
| 2014/0184447 A1* | 7/2014 | Zhou | G01S 13/84 342/127 |
| 2014/0211691 A1 | 7/2014 | Emadzadeh | |
| 2015/0128707 A1* | 5/2015 | Viikari | G01H 13/00 73/584 |

FOREIGN PATENT DOCUMENTS

| | | | | |
|---|---|---|---|---|
| JP | 2001021644 | | 1/2001 | |
| JP | 2005017112 | | 1/2005 | |
| JP | EP 2124348 A1 * | 11/2009 | | G06K 19/07749 |
| WO | 2010129589 | | 12/2010 | |

OTHER PUBLICATIONS

International Searching Authority (ISA/CA), International Search Report and Written Opinion, mailed May 13, 2014, for corresponding International Patent Application No. PCT/CA2014/000151.

Violino, B., "The Basics of RFID Technology", RFID Journal., Jan. 2005, pp. 1-4.

D. Arnitz, et al. "Multifrequency Continuous-Wave Radar Approach to Ranging in Passive UHF RFID". IEEE Transactions On Microwave Theory And Techniques, vol. 57, No. 5, May 2009, 8 pages.

* cited by examiner

METHOD AND SYSTEM FOR IDENTIFYING AND FINDING A RANGE OF AN OBJECT

This application claims priority from U.S. Provisional Patent Application No. 61/866,687, filed Aug. 16, 2013, and incorporated herein by reference.

FIELD OF THE INVENTION

This invention relates to the field of radio frequency identification and range finding systems, and more specifically, to a method and system for identifying and finding a range of an object.

BACKGROUND OF THE INVENTION

Radio frequency identification ("RFID") systems have become very popular in a great number of applications. A typical RFID system 100 is shown in FIG. 1. The RFID system 100 includes an application system 110, a reader 120, and a tag 130. When the tag 130 appears in the operational range of the reader 120, it starts receiving both energy 140 and data 150 via its antenna 133 from the reader 120 via its transmitter/receiver 121 and antenna 123. A rectify circuit 131 in the tag 130 collects and stores the energy 140 for powering the other circuits (e.g., control/modulator 132) in the tag 130. After collecting enough energy 140, the tag 130 may operate and send back pre-stored data to the reader 120. The reader 120 then passes the received response data via a communications interface 160 to the server system/database 111 of the application system 110 for system applications.

The tags 130 in RFID system 100 may be classified into passive and active types according to the power provisions of the tags. Passive tags do not have their own power supply and therefore draw all power required from the reader 120 by electromagnetic energy received via the tag's antenna 133. In contrast, active tags incorporate a battery which supplies all or part of the power required for their operation.

A typical transmission method of energy 140 and data 150 between a reader 120 and a tag 130 in a RFID system 100 is by way of backscatter coupling (or backscattering). The antenna 123 of the reader 120 couples energy 140 to the tag 130. By modulating the reflection coefficient of the tag's antenna 133, data 150 may be transmitted between the tag 130 and the reader 120. Backscattering, as shown in FIG. 2, is typically used in microwave band RFID systems. Power $P_{in}$ 210 is emitted from the reader's antenna 123. A small proportion of $P_{in}$ 210 is received by the tag's antenna 133 and is rectified to charge the storing capacitor in the tag 130 for serving as a power supply. After gathering enough energy, the tag 130 begins operating. A portion of the incoming power $P_{in}$ 210 is reflected by the tag's antenna 133 and returned as power $P_{return}$ 220. The reflection characteristics may be influenced by altering the load connected to the antenna 133. In order to transmit data 150 from the tag 130 to the reader 120, for example, a transistor may be switched on and off in time with the transmitted data stream. The magnitude of the reflected power $P_{return}$ 220 may thus be modulated and picked up by the reader's antenna 123.

In backscattering RFID systems, a number of tags 130 interact with a main reader device 120 as shown in FIG. 3. The reader 120 is used to: (i) power up the tags 130 via the power of the RF signal; (ii) transfer data to the tags 130; and, (iii) read information from the tags 130. Amplitude shift keying ("ASK") modulation is typically used in RFID systems 100. In ASK modulation, the amplitude of the carrier is switched between two states controlled by the binary transmitting code sequence. Also, in some applications, phase shift keying ("PSK") modulation may also be used.

One problem with existing RFID systems is that they have limited capability with respect to ranging or determining the range or location of a tag or object.

A need therefore exists for an improved method and system for identifying and finding a range of an object. Accordingly, a solution that addresses, at least in part, the above and other shortcomings is desired.

SUMMARY OF THE INVENTION

According to one aspect of the invention, there is provided a method for identifying and ranging a wireless device, comprising: transmitting an original radar signal from a detecting system; in response to the original radar signal, receiving a modulated radar signal at the detecting system, the modulated radar signal being backscattered from an antenna of the wireless device and containing information pertaining to the wireless device, and the modulated radar signal being a frequency offset version of the original radar signal; and, using a processor at the detecting system, determining an identity and a range of the wireless device from the modulated radar signal.

In accordance with further aspects of the invention there is provided an apparatus such as a data processing system, a method for adapting same, as well as articles of manufacture such as a computer readable medium or product and a computer program product or software product (e.g., comprising a non-transitory medium) having program instructions recorded or stored thereon for practicing the method of the invention.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXEMPLARY EMBODIMENTS

In the following description, details are set forth to provide an understanding of the invention. In some instances, certain software, circuits, structures, techniques and methods have not been described or shown in detail in order not to obscure the invention. The term "data processing system" is used herein to refer to any machine for processing data, including the computer systems, detecting systems, wireless devices, radio frequency identification ("RFID") systems, radar systems, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 1:
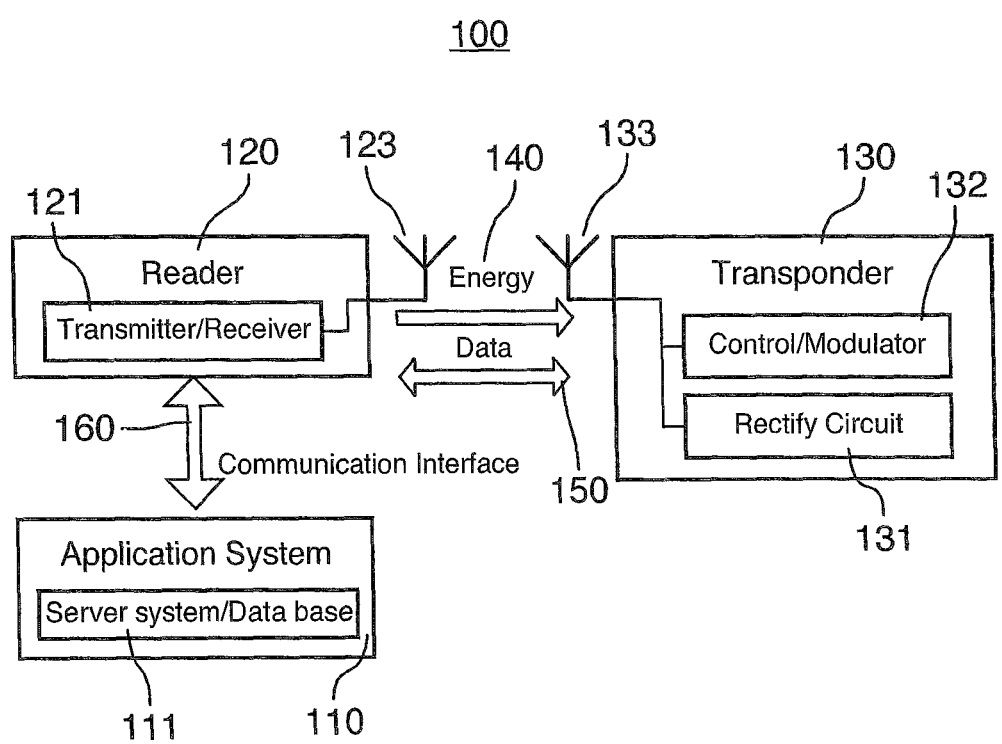
FIG. 1 is a block diagram illustrating a radio frequency identification (RFID) system in accordance with the prior art.
Figure 2:
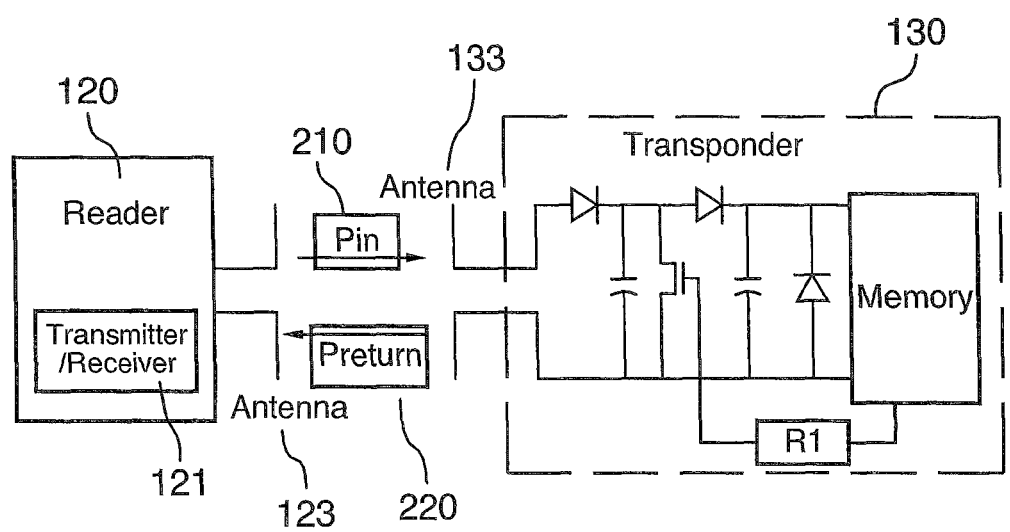
FIG. 2 is a block diagram illustrating transmission of energy and data between a reader and a tag in a RFID system in accordance with the prior art.
Figure 3:
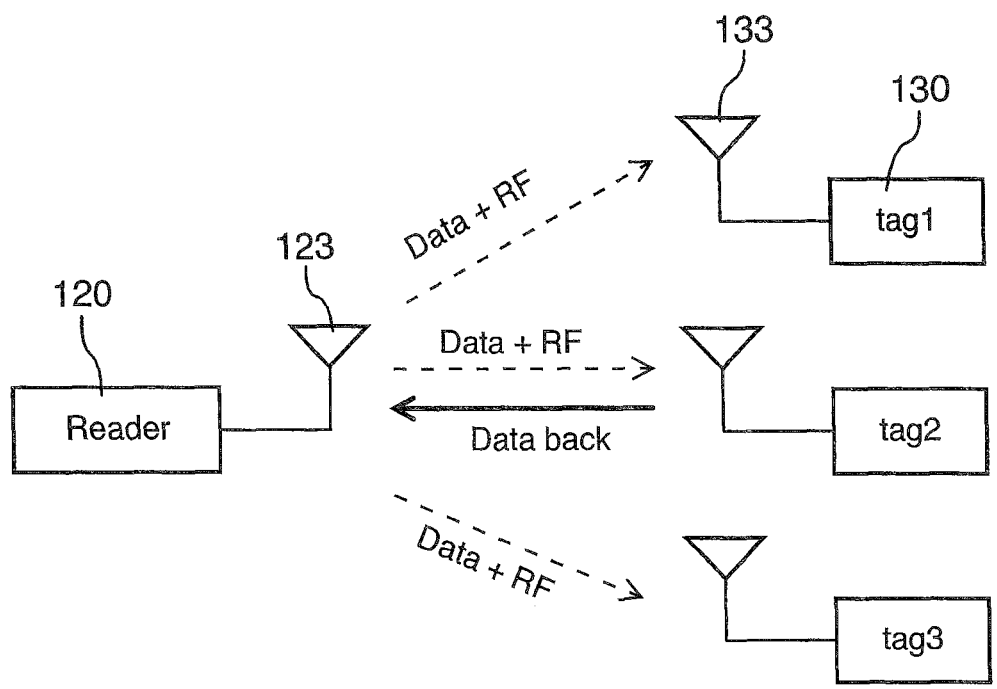
FIG. 3 is a block diagram illustrating communications between a reader and multiple tags in an RFID system in accordance with the prior art.
Figure 4:
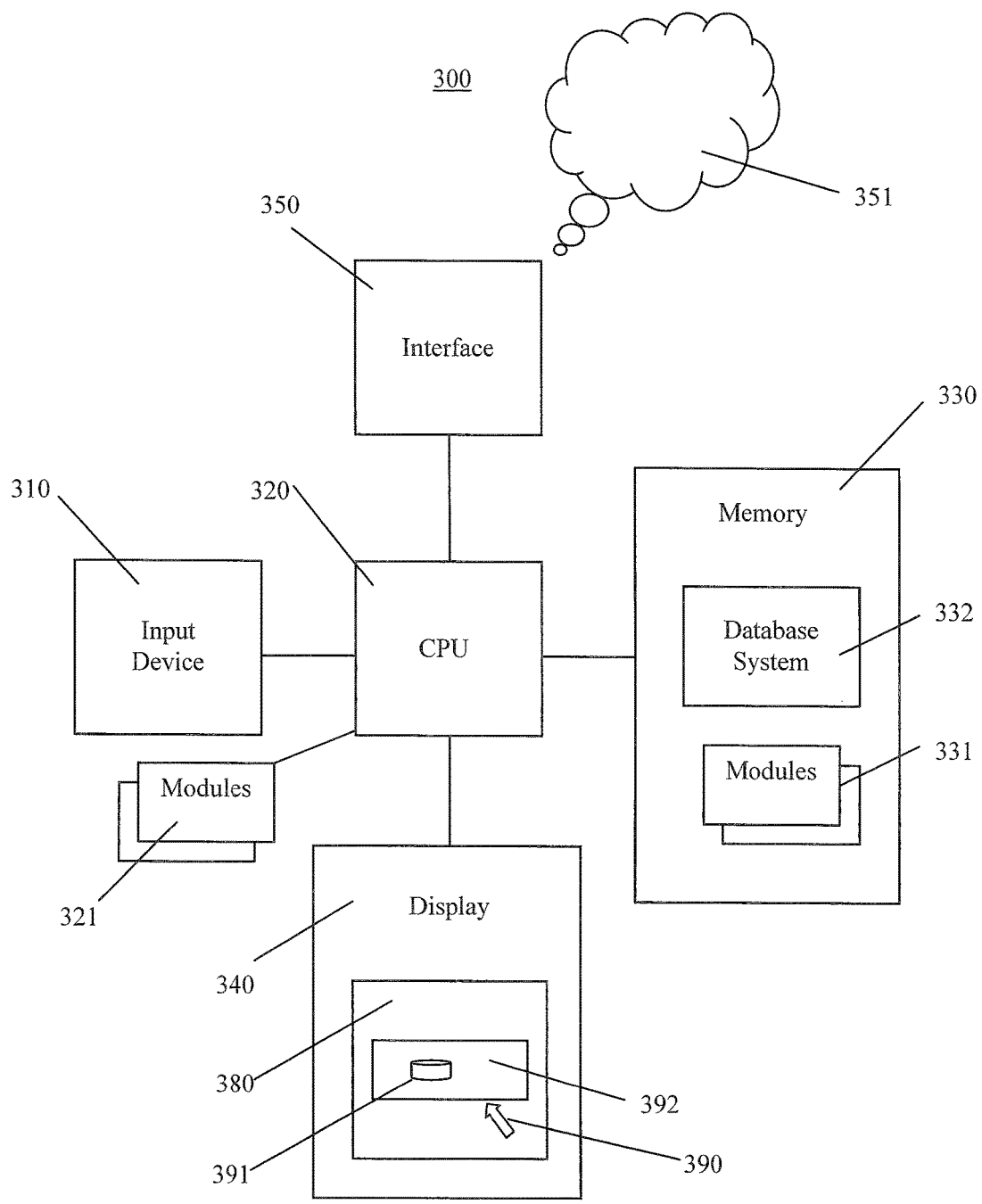
FIG. 4 is a block diagram illustrating a data processing system in accordance with an embodiment of the invention.

FIG. 4 is a block diagram illustrating a data processing system 300 in accordance with an embodiment of the invention. The data processing system 300 is suitable for use in a RFID system (e.g., 100, 110) such as a radar-based identification and range finding system 500 as a reader (e.g., 120) or detecting system 520 and/or as a tag (e.g., 130), object, or wireless device 530. The data processing system 300 is also suitable for generating, displaying, and adjusting presentations in conjunction with a graphical user interface ("GUI"), as described below. The data processing system 300 may be a client and/or server in a client/server system. For example, the data processing system 300 may be a server system or a personal computer ("PC") system. The data processing system 300 may also be a wireless device or other mobile, portable, or handheld device. The data processing system 300 includes an input device 310, a central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae (e.g., 523, 533), etc. In addition, the data processing system 300 may include a Global Positioning System ("GPS") receiver. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a database system 332 (or store) for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., a memory stick, a compact disk ("CD"), etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 5:
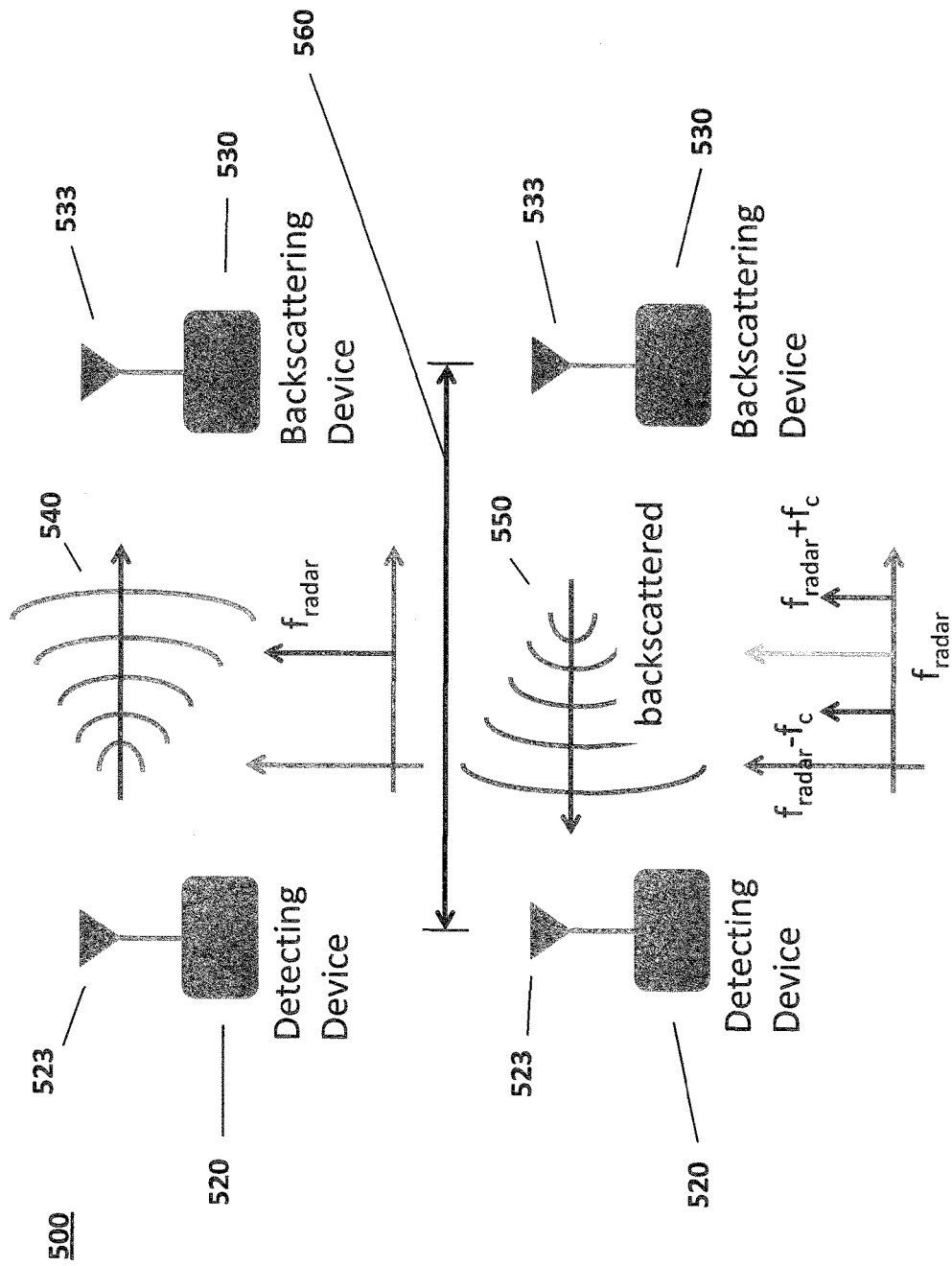
FIG. 5 is a block diagram illustrating a radar-based identification and range finding system using offset backscattering in accordance with an embodiment of the invention.
Figure 6:
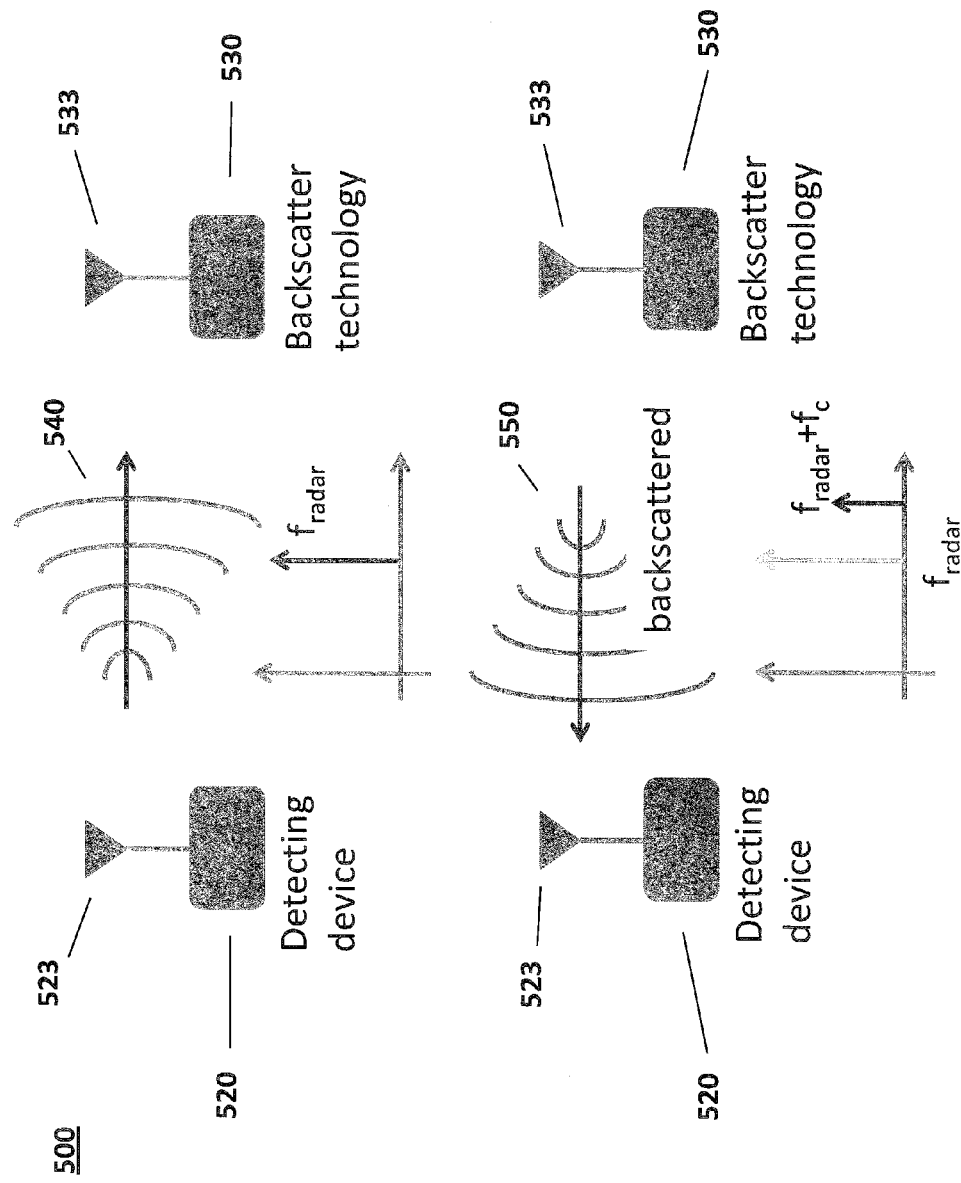
FIG. 6 is a block diagram illustrating a single-sideband radar-based identification and range finding system using offset backscattering in accordance with an embodiment of the invention.

FIG. 5 is a block diagram illustrating a radar-based identification and range finding system 500 using offset backscattering in accordance with an embodiment of the invention. And, FIG. 6 is a block diagram illustrating a single-sideband radar-based identification and range finding system 500 using offset backscattering in accordance with an embodiment of the invention.

According to one embodiment of the invention, the identification and range finding system 500 includes a radar detecting device, reader, or system 520 and an object, tag, or wireless device 530. Each of detecting system 520 and wireless device 530 may include or have a configuration similar to that of the data processing system 300. According to one embodiment, the detecting system 520 may be or be included in another wireless device 530.

The present invention provides a method and system for determining the range 560 or location of a wireless device 530 using radar techniques. The wireless device 530 reflects back or backscatters a unique frequency offset signal 550 to the detecting system 520. The invention enables wireless devices 530 to backscatter an identification ("ID") signature (e.g., a controlled offset frequency) within a ranging or locating system 500.

According to one embodiment, a radar antenna 523 at the detecting system 520 produces (or sends out or transmits) an electromagnetic wave 540 centered at a frequency $f_{radar}$. A wireless device 530 scatters back an electromagnetic wave 550 which is offset from the frequency $f_{radar}$ by a frequency $f_c$ and/or $-f_c$.

The radar antenna 523 of the detecting system 520 then receives or senses the backscattered wave or signal 550 offset at a frequency $f_{radar}+f_c$ (and $f_{radar}-f_c$ for the system 500 of FIG. 5 or $f_{radar}-f_c$ for the single-sideband system 500 of FIG. 6). By using techniques such as power measurement, etc., the range 560 or location of the backscattering wireless device 530 may then be determined by the detecting system 520.

In terms of power measurement, the power returned $P_r$ to the receiver antenna 523 of the detecting system 520 is given by the equation:

$$P_r = \frac{P_t G_t A_r \sigma F^4}{(4\pi)^2 R^4}$$

where $P_t$ is the transmitting power of the transmitter of the detecting system 520, $G_t$ is the gain of the detecting system's transmitting antenna 523, $A_r$ is the effective aperture of the receiver antenna 533 of the wireless device 530, $\sigma$ is the radar cross section, F is the pattern propagation, and R is the range 560 or distance between the detecting system 520 and the wireless device 530. Given that the received power $P_r$ is offset in frequency from the transmitted signal 540, it does not suffer from its own direct-current ("DC") offset since the backscattered signal 550 is offset by a frequency $f_c$.

According to one embodiment, a modulated continuous wave signal 540 from the detecting system 520 is used. A variety of modulations are possible. Various modulation signals used in radar-based systems include: sine waves; saw tooth waves; triangle waves; square waves; and, chirp signals.

Figure 7:
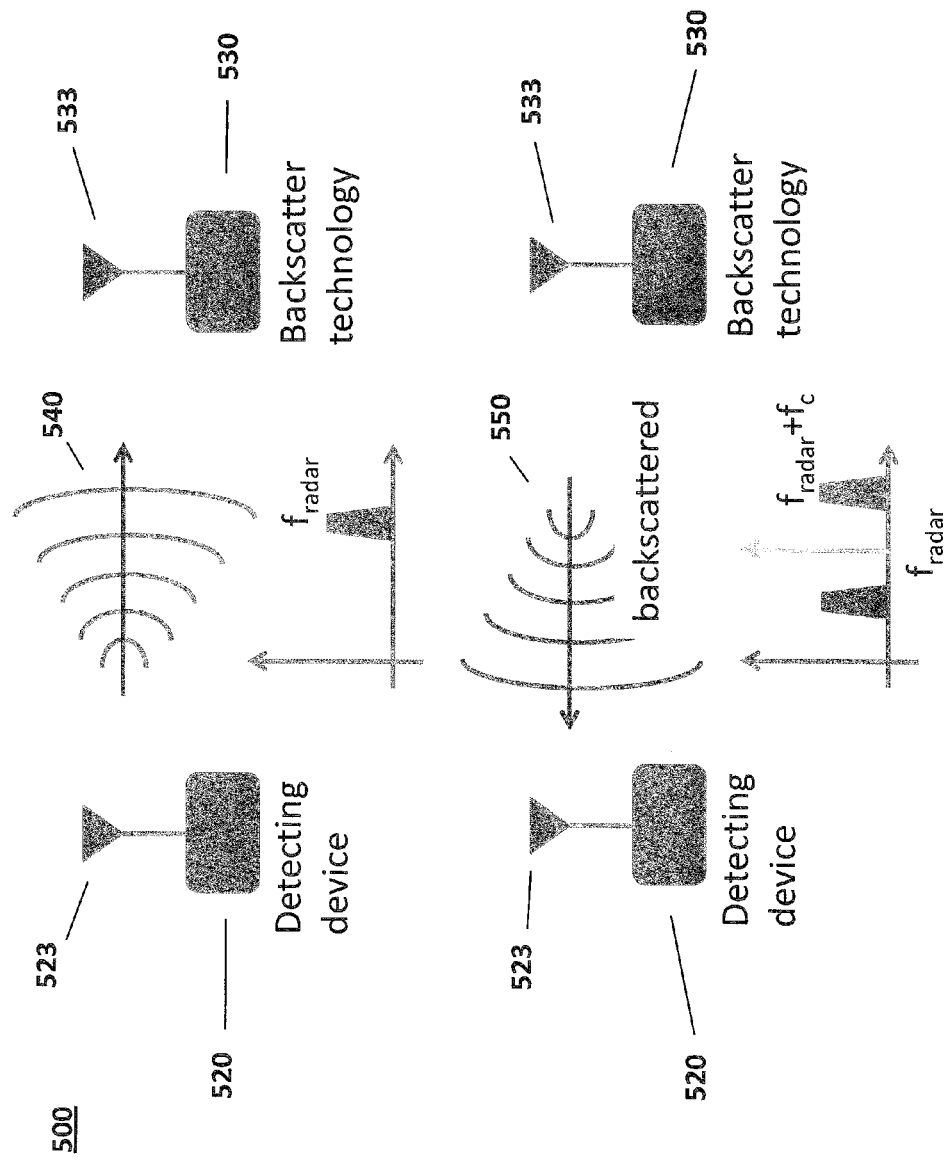
FIG. 7 is a block diagram illustrating a radar-based identification and range finding system using chirp signals in accordance with an embodiment of the invention.

FIG. 7 is a block diagram illustrating a radar-based identification and range finding system 500 using chirp signals in accordance with an embodiment of the invention. In the embodiment of FIG. 7, a modulated original signal (e.g., a chirp signal) 540 is generated by the detecting system 520. The modulated signal 540 is then offset 550 by the backscattering wireless device 530. In this embodiment, continuous-wave radar techniques may be used (see, for example, Luck, David G. C., "Frequency Modulated Radar", McGraw-Hill, New York, N.Y., 1949, 466 pages, which is incorporated herein by reference). In this embodiment, since the signal 550 received by the detecting system 520 is offset in frequency $f_c$, techniques that are used in full duplexed systems may be used or employed to reduce the leakage from the transmitter into the receiver of the detecting system 520. For example, SAW type duplexers may be used to isolate the transmitter from the receiver.

According to one embodiment, a linear chirping signal (i.e., sawtooth frequency modulated signal) may be used in the system 500. In this embodiment, the following set of equations may be applied:

$$k=\Delta f_r/\Delta t_{radar}$$

where $\Delta f_r$ is the radar frequency sweep amount and $\Delta t_{radar}$ is the time required to sweep the frequency. The instantaneous frequency difference of the signal received at the detecting system 520 is given by $$\Delta f=\delta t*k+f_c$$

where $\delta t$ is round trip transit time and $f_c$ is the frequency offset. The relative distance or range 560 of the wireless device 530 is then given by:

$$\text{Range}=c\delta t/2$$

where c is the speed of light.

Figure 8:
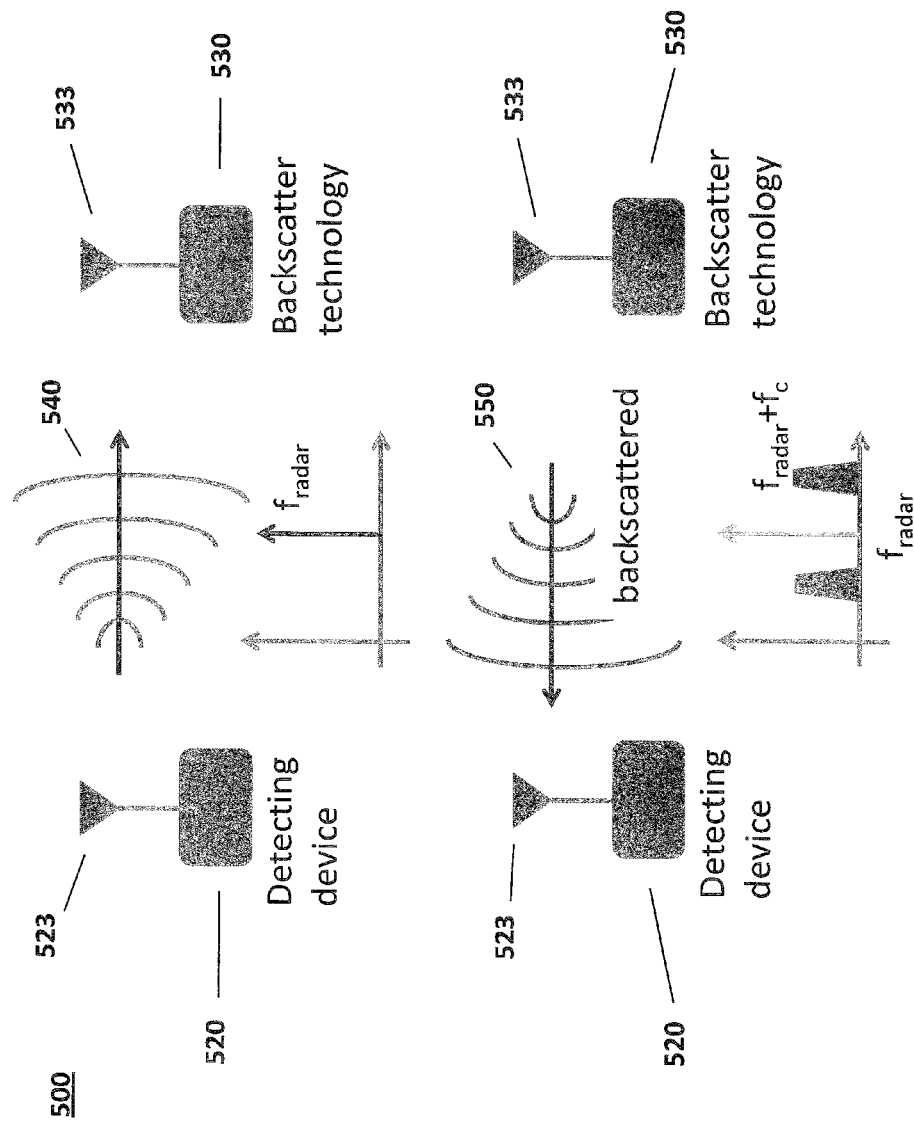
FIG. 8 is a block diagram illustrating a radar-based identification and range finding system using sinusoidal wave signals in accordance with an embodiment of the invention; and, FIG. 9 is a flow chart illustrating operations of modules within a detecting system for identifying and ranging a wireless device, in accordance with an embodiment of the invention.

FIG. 8 is a block diagram illustrating a radar-based identification and range finding system 500 using sinusoidal wave signals in accordance with an embodiment of the invention. In the embodiment of FIG. 8, the detecting system 520 transmits a sine wave signal 540 and the backscattering wireless device 530 sends a modulated signal 550 that is offset by frequency $f_c$. If sinusoidal frequency modulation is used, the receiver never needs to stop processing incoming signals because modulated waveforms are continuous (i.e., no impulse modulation as used in some radar systems). In this embodiment, the amount of spectrum spreading caused by modulation riding on the received signal is proportional to the range 560 or distance to the reflecting object or wireless device 530. For example, the time-domain equation for a frequency modulated ("FM") signal y(t) is given by:

$$y(t)=\cos(2\pi f(t)t)$$

where, $$f(t)=f_{rf}+B\cos(2\pi f_m t)$$

where B is the modulation index, $f_m$ is the modulation frequency, and $f_{rf}$ is the radio frequency ("RF") carrier frequency. The signal that arrives at the antenna 533 of the wireless device 530 is given by:

$$\cos[2\pi f(t+\delta t/2)(t+\delta t/2)]$$

where δt is the time delay. The signal 550 coming back from the wireless device 530 is frequency offset and delayed in time in accordance with the following equation:

$$\cos[2\pi f(t+\delta t)(t+\delta t)+2\pi f_c t+\phi]$$

where $f_c$ is the offset frequency, δt is the time delay, and φ is a phase error due to the wireless device 530. Note that there is an offset in frequency of $f_m$. The detecting system 520 then down converts the received signal 550 using the original signal 540 it initially sent. Using the "Carson bandwidth rule" (see Carson, J. R., "Notes on the Theory of Modulation", Proc. IRE, vol. 10, no. 1, February 1922, pp. 57-64, which is incorporated herein by reference), for example, the amount of spread placed on the signal is thus:

$$\text{modulation\_spectrum\_spread}=2(B+1)f_m \sin(\delta t)$$

Therefore, the range 560 of the wireless device 530 is given by:

$$\text{Range}=c\delta t/2$$

where c is the speed of light.

According to one embodiment, the detecting system 520 transmits an original signal 540 and the wireless device 530, in response to the original signal 540, backscatters a modulated signal 550 that is a frequency offset ($f_c$) version of the original signal 540. Backscattering of a frequency offset modulated signal 550 is described, for example, in United States Patent Application Publication No. US 2014/0016719 A1, published Jan. 16, 2014, and incorporated herein by reference. Unlike standard radar systems, according to the present invention the wireless device 530 backscatters and offsets the frequency of the incoming radar signal 540. According to one embodiment, the frequency of the backscattered signal 550 is offset and is also modulated. According to another embodiment, the offset frequency $f_c$ changes with time (i.e., it is similar to a chirp signal). Note that for a generalized implementation, the wireless device 530 may reflect back any modulated and/or frequency offset signal 550.

The above embodiments may contribute to an improved method and system for identifying and finding a range 560 of an object 530 and may provide one or more advantages. For example, the system 500 may be used for both identification of an object (e.g., a wireless device) 530 and for finding a range 560 of the object (e.g., the wireless device) 530.

Aspects of the above described method may be summarized with the aid of a flowchart.

Figure 9:
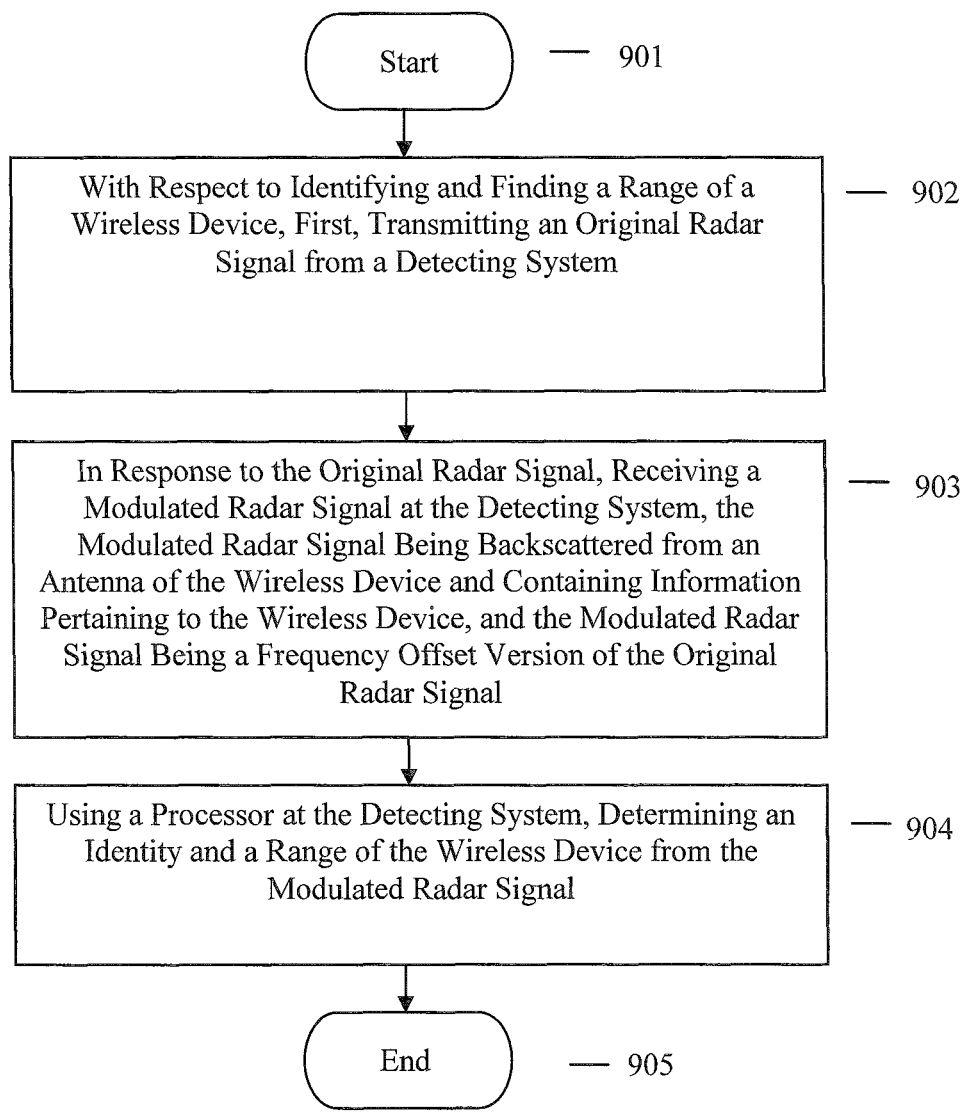

FIG. 9 is a flow chart illustrating operations 900 of modules (e.g., software or hardware modules 331, 321) within a detecting system (e.g., 300, 520) for identifying and ranging a wireless device 530, in accordance with an embodiment of the invention.

At step 901, the operations 900 start.

At step 902, an original radar signal 540 is transmitted from the detecting system 520.

At step 903, in response to the original radar signal 540, a modulated radar signal 550 is received at the detecting system 520, the modulated radar signal 550 being backscattered from an antenna 533 of the wireless device 530 and containing information pertaining to the wireless device 530, and the modulated radar signal 550 being a frequency offset (e.g., $f_c$) version of the original radar signal 540.

At step 904, using a processor 320 at the detecting system 520, an identity and a range 560 of the wireless device 530 is determined from the modulated radar signal 550.

At step 905, the operations 900 end.

The above method may further include measuring a power of the modulated radar signal 550 at the detecting system 520, the power of the modulated radar signal 550 being inversely proportional to the range 560 of the wireless device 530 to the fourth power. The method may further include measuring a time delay between the original radar signal 540 and the modulated radar signal 550, the range 560 of the wireless device 530 being inversely proportional to the time delay. The identity may be an identification number contained in the information pertaining to the wireless device 530. The original radar signal 540 may be one of a sine wave, a saw tooth wave, a triangle wave, a square wave, and a chirp signal. The modulated radar signal 550 may be one of a sine wave, a saw tooth wave, a triangle wave, a square wave, and a chirp signal. The range 560 may be a distance between the detecting system 520 and the wireless device 530. The wireless device 530 may be a radio frequency identification ("RFID") tag. The detecting system 520 may be a radio frequency identification ("RFID") reader. And, the detecting system 520 may be or may be included in another wireless device.

According to one embodiment, each of the above steps 901-905 may be implemented by a respective software module 331. According to another embodiment, each of the above steps 901-905 may be implemented by a respective hardware module 321. According to another embodiment, each of the above steps 901-905 may be implemented by a combination of software 331 and hardware modules 321. For example, FIG. 9 may represent a block diagram illustrating the interconnection of specific hardware modules 901-905 (collectively 321) within a data processing system 300, each hardware module 901-905 adapted or configured to implement a respective step of the method of the invention.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or product including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 may be contained in a data carrier product according to one embodiment of the invention. This data carrier product may be loaded into and run by the data processing system 300. In addition, the sequences of instructions which when executed cause the method described herein to be performed by the data processing system 300 may be contained in a computer program product or software product (e.g., comprising a non-transitory medium) according to one embodiment of the invention. This computer program or software product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the invention. This integrated circuit product may be installed in the data processing system 300.

The embodiments of the invention described above are intended to be exemplary only. Those skilled in this art will understand that various modifications of detail may be made to these embodiments, all of which come within the scope of the invention.

What is claimed is:

1. A method for identifying and ranging a wireless device, comprising:
    transmitting chirp radar signal from a detecting system;
    in response to the chirp radar signal, receiving a modulated radar signal at the detecting system, the modulated radar signal: (i) being backscattered from an antenna of the wireless device, (ii) containing information pertaining to the wireless device, and (iii) being a frequency offset version of the chirp radar signal;
    determining an identity of the wireless device from the modulated radar signal; and
    determining a range of the wireless device from the modulated radar signal, which is proportional to an instantaneous frequency difference of the modulated radar signal minus the frequency offset.

2. The method of claim 1 and further comprising measuring a power of the modulated radar signal at the detecting system, and further determining the range based on the power of the modulated radar signal.

3. The method of claim 1 and further comprising measuring a time delay between the chirp radar signal and the modulated radar signal, and responsively determining the range of the wireless device.

4. The method of claim 1 wherein the identity is an identification number contained in the information pertaining to the wireless device.

5. The method of claim 1 wherein the chirp radar signal is replaced with one of a sine wave, a triangle wave, and a square wave.

6. The method of claim 1 wherein the modulated radar signal is one of a sine wave, a saw tooth wave, a triangle wave, a square wave, and a chirp signal.

7. The method of claim 1 wherein the range is a distance between the detecting system and the wireless device.

8. The method of claim 1 wherein the wireless device is a radio frequency identification ("RFID") tag.

9. The method of claim 1 wherein the detecting system is a radio frequency identification ("RFID") reader.

10. The method of claim 1 wherein the detecting system is or is included in another wireless device.

11. A system for identifying and ranging a wireless device, comprising:
    a processor coupled to memory, a transmitter, and a receiver; and,
    at least one hardware module and at least one software module controlled or executed by the processor, the modules comprising:
        a module for controlling the transmitter to transmit an chirp radar signal from the system;
        a module for controlling the receiver to, in response to the chirp radar signal, receive a modulated radar signal, the modulated radar signal: (i) being backscattered from an antenna of the wireless device, (ii) containing information pertaining to the wireless device, and (iii) being a frequency offset version of the chirp radar signal;
        a module for determining an identity of the wireless device from the modulated radar signal; and
        a module for determining a range of the wireless device from the modulated radar signal, which is proportional to an instantaneous frequency difference of the modulated radar signal minus the frequency offset.

12. The system of claim 11 and further comprising a module for measuring a power of the modulated radar signal at the system, and further determining the range based on the power of the modulated radar signal.

13. The system of claim 11 and further comprising a module for measuring a time delay between the chirp radar signal and the modulated radar signal, and responsively determining the range of the wireless device.

14. The system of claim 11 wherein the identity is an identification number contained in the information pertaining to the wireless device.

15. The system of claim 11 wherein the chirp radar signal is replaced with one of a sine wave, a triangle wave, and a square wave.

16. The system of claim 11 wherein the modulated radar signal is one of a sine wave, a saw tooth wave, a triangle wave, a square wave, and a chirp signal.

17. The system of claim 11 wherein the range is a distance between the detecting system and the wireless device.

18. The system of claim 11 wherein the wireless device is a radio frequency identification ("RFID") tag.

19. The system of claim 11 wherein the system is a radio frequency identification ("RFID") reader.

20. The system of claim 11 wherein the system is or is included in another wireless device.

* * * * *